Figure 1:
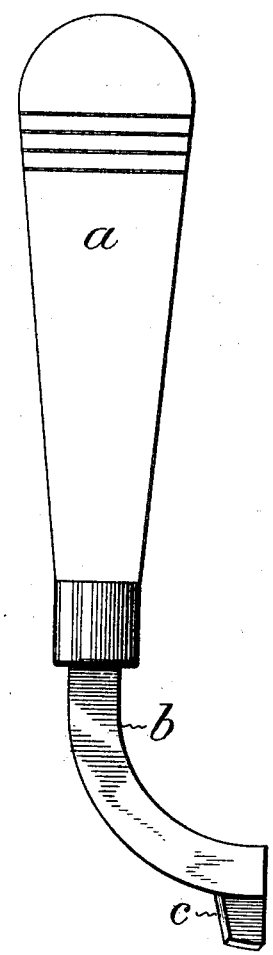

No. 699,815. Patented May 13, 1902.
W. J. RIDDICK.
RIND SCORER.
(Application filed Dec. 16, 1901.)
(No Model.)

Witnesses:

Inventor:
William J. Riddick,
by Henry H. Bates.
atty.

UNITED STATES PATENT OFFICE.

WILLIAM J. RIDDICK, OF KINGSTON, NEW YORK.

RIND-SCORER.

SPECIFICATION forming part of Letters Patent No. 699,815, dated May 13, 1902.

Application filed December 16, 1901. Serial No. 86,087. (No model.)

*To all whom it may concern:*

Be it known that I, WILLIAM J. RIDDICK, a citizen of the United States, residing at Kingston, in the county of Ulster and State of New York, have invented certain new and useful Improvements in Rind-Scorers; and I do hereby declare the following to be a full, clear, and exact description of the invention, such as will enable others skilled in the art to which it appertains to make and use the same.

My invention relates to culinary implements known as "rind-scorers" used by cooks in preparing meats, such as pork, for roasting or baking.

The improvement consists in the article or utensil hereinafter described, and pointed out in the claim and illustrated in the drawings forming a part of this specification, in which—

Figure 2:
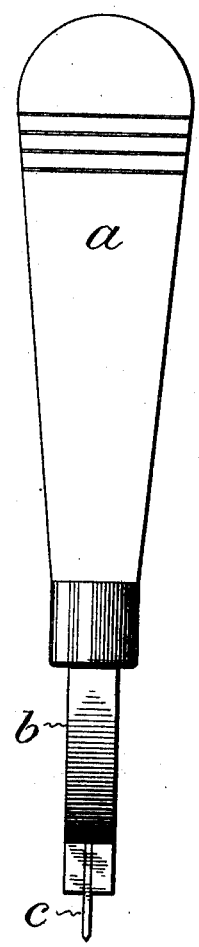
Figure 3:
Figure 4:
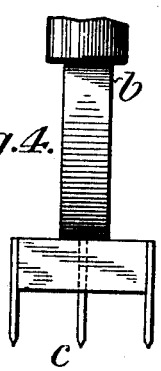

Figure 1 is a side elevation of the device. Fig. 2 is an elevation taken at right angles to the plane of Fig. 1. Fig. 3 is a detail view of a modification showing duplicate cutting-blades. Fig. 4 is another detail view illustrating a plurality of blades.

In the preparation of meats for the baking-oven which are cooked in the rind it is customary for the cook or butcher to score the rind in parallel cuts to permit the heat to penetrate the meat on that side and cook the same equally and also to facilitate the slicing of the meat when it comes to be served without removing the rind as a whole. These cuts to be neatly and properly made require to be parallel and also of uniform depth, not penetrating needlessly much beyond the thickness of the rind. To do this artistically is a matter requiring both time and considerable skill when done with no more suitable instrument than a cook's knife, as has hitherto been the case, and even then is rarely accomplished with entire success. By my improved implement the operation can be performed quickly, accurately, and artistically by the least accomplished of cooks to the great improvement not only of the appearance of the roast, but also of the uniformity of its cooking and ease and taste in serving.

In the drawings, $a$ denotes the handle; $b$, the shank, which is preferably square in section and curved through a quarter-circle, and $c$ is the cutting blade or blades, which should extend down below the shank to the proper depth to make the cut through the rind without unduly penetrating the meat, the shank forming a shoulder to gage the depth of the cut. Since the implement when in use is grasped by the hand so that the handle $a$ stands vertically, with the shank $b$ projecting below the little finger, the curvature of the shank gives directive quality to the blade, thus facilitating the making of straight cuts somewhat on the principle of the caster, and in practice the plurality of blades not only saves time in making the successive cuts, but insures parallelism and also equidistance, which contributes to the artistic appearance of the viand. In operating with the multiple-blade tool one of the blades may be used in the last cut as a guide to insure parallelism, when the whole roast will appear as if scored by a single operation.

I claim and desire to secure by Letters Patent—

A rind-scorer, consisting of handle $a$, adapted to be held vertically when in use, shank $b$, curved through substantially a right angle, and a cutting blade or blades $c$, projecting downward from said shank at or near its extremity in a direction parallel with the axis of the handle, the bottom cutting edges being transverse to said axis, for scoring the rind of meat to a uniform depth preparatory to cooking, substantially as specified.

In testimony whereof I affix my signature in presence of two witnesses.

WILLIAM J. RIDDICK.

Witnesses:
ALDEN J. HARCOURT,
ABRAM M. ROOZ.